Oct. 16, 1951 R. W. SANDERS 2,571,168
TELEVISION SYNCHRONIZING CIRCUIT
Filed June 7, 1947
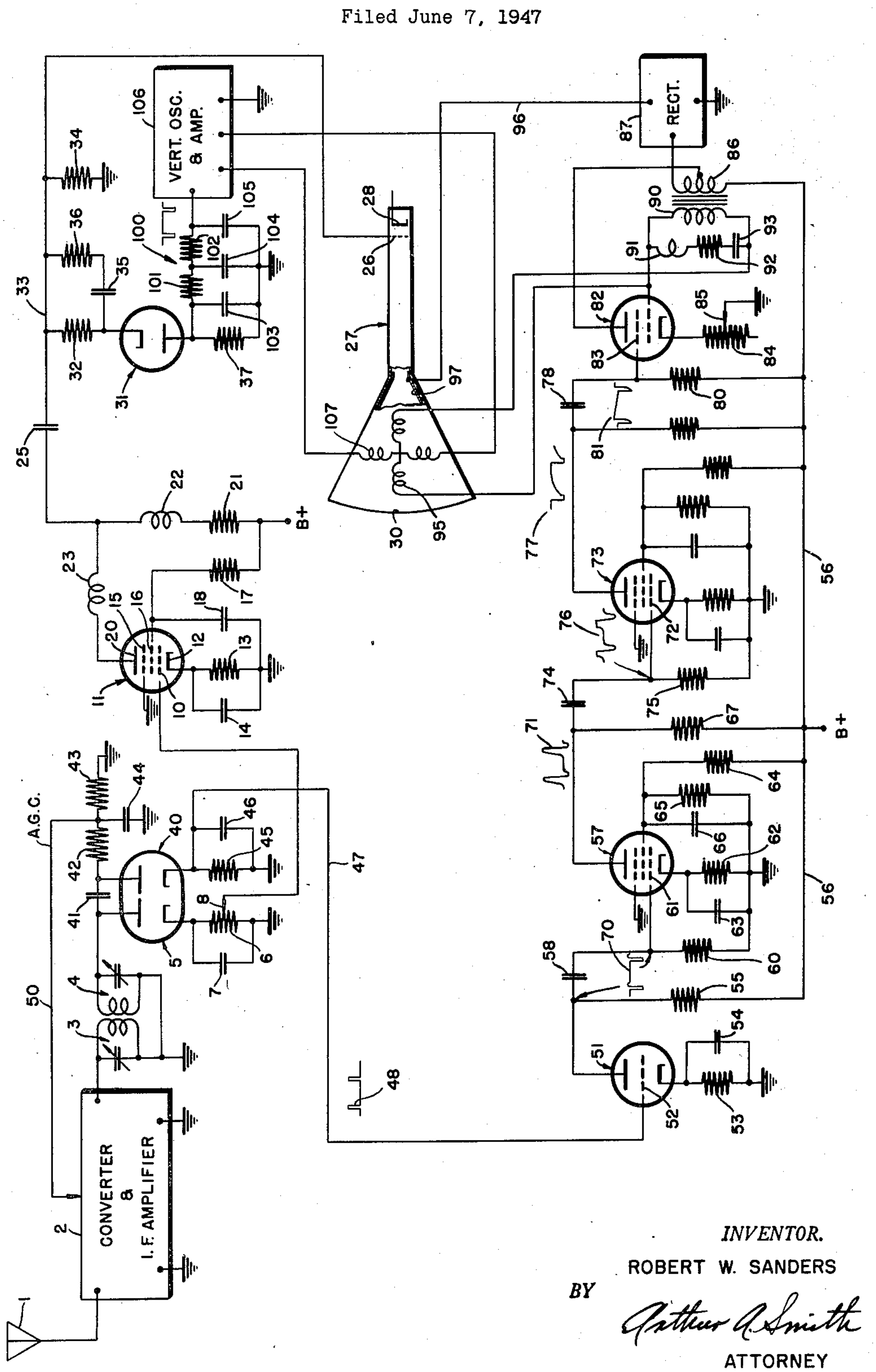
INVENTOR.
ROBERT W. SANDERS
BY Arthur A. Smith
ATTORNEY Patented Oct. 16, 1951

2,571,168

UNITED STATES PATENT OFFICE 2,571,168

TELEVISION SYNCHRONIZING CIRCUIT

Robert W. Sanders, Fort Wayne, Ind., assignor, by mesne assignments, to Farnsworth Research Corporation, a corporation of Indiana Application June 7, 1947, Serial No. 753,267

2 Claims. (Cl. 178—7.3)

This invention relates generally to television receivers and particularly to synchronizing circuits therefor.

The synchronizing circuits of a television receiver are probably more important than, for example, the intermediate frequency and video channels because loss of synchronization in the receiver completely destroys all picture information. One of the most serious causes of loss of synchronization is external noise pulses. It is conventional practice to provide a television receiver with synchronizing circuits including free-running oscillators for developing the horizontal and vertical scanning waves. Thus it has been proposed to compare the frequency of the oscillators at the receiver with the average frequency of the transmitted synchronizing pulses by means of an automatic frequency control circuit. A circuit of this type has a number of advantages. In particular it has high immunity to external noise such as man-made interference which may originate from the ignition system of an automobile. On the other hand, any periodic man-made noise or interference will completely disrupt the synchronizing circuit. Such periodic external noise may originate, for example, from an electric shaver. Another drawback of this conventional synchronizing circuit employing free-running oscillators is that the automatic frequency control circuit requires more tubes which makes the television receiver bulkier, more expensive and adds to its power requirements. A further drawback of this circuit is that the free-running oscillators are not stable over extended periods of time. Therefore, a horizontal and a vertical hold control knob must be brought out to the front panel of the receiver for adjusting the free-running period of the horizontal and vertical oscillators which adds to the mechanical complexity of the receiver.

Another conventional synchronizing circuit employs either free-running oscillators which are synchronized by each synchronizing pulse or one cycle oscillators which must be triggered. In that case the operation of the oscillators is dependent upon the proper reception of each synchronizing pulse. A circuit of this type has the advantage that fewer tubes are required than for an automatic frequency controlled synchronizing circuit. On the other hand, the main drawback of a synchronized oscillator circuit is that it is affected by external noise pulses. According to conventional practice, the horizontal and vertical synchronizing pulses are separated together by amplitude selection from the video signal and are usually amplified by a common amplifier. Thereafter, the horizontal synchronizing pulses are selected by a differentiating network while the vertical synchronizing pulses are separated by an integrating network. The time constants of the coupling networks common to both synchronizing signals accordingly must be long enough to pass the vertical synchronizing pulses. A high amplitude noise pulse accordingly will draw grid current and will bias the following synchronizing amplifiers beyond cutoff for a considerable period of time. During this time, no synchronizing pulses are passed by the circuit, the horizontal oscillator is not synchronized and a large number of lines is displaced after the occurrence of each noise pulse which will completely destroy all picture information.

It is also of considerable importance from which point of the television signal channel the synchronizing pulses are derived. On the one hand, it is desired to obtain the synchronizing pulses, for example, from the last video amplifier stage so that the amplitude of the synchronizing pulses is sufficient to trigger the scanning wave oscillators directly. However, this arrangement has the drawback that the video contrast control is now arranged in front of the synchronizing circuit, and at low contrast levels the synchronizing pulses may be of insufficient amplitude. At high contrast levels a portion of the video signal is impressed on the synchronizing circuits which is particularly objectionable in the horizontal synchronizing channel. On the other hand, the vertical synchronizing pulses are not appreciably affected even if a portion of the video signal is transmitted with the pulses because the signal is fed through an integrating network wherein the video signal will substantially be balanced out.

It is an object of the present invention, therefore, to provide, in a television receiver, novel synchronizing signal circuits coupled to triggered or synchronized oscillators and arranged to minimize the effect of external noise on the oscillators.

A further object of the invention is to provide, in a television receiver, a horizontal synchronizing signal separator circuit coupled to an amplifier stage of the television channel so that the horizontal synchronizing signal is not affected by adjustments of the video contrast control, while the vertical synchronizing signal separator circuit is coupled to another video amplifier stage to derive a vertical synchronizing signal of high amplitude.

Another object of the invention is to provide a horizontal synchronizing separator circuit for a television receiver which permits to couple all the horizontal synchronizing signal amplifier stages by differentiating networks having a time constant that is short compared to the reciprocal of the frequency of the horizontal synchronizing signal which will render the circuit substantially as immune to external noise as is an automatic frequency controlled synchronizing circuit.

In accordance with the present invention there is provided, in a television receiver adapted to receive a composite television signal including a first and second synchronizing signal and a video signal, a television signal channel including a plurality of amplifier stages. There are provided means which are coupled to one of the amplifier stages for deriving the first synchronizing signal. Furthermore, there are provided means coupled to another one of the amplifier stages for deriving the second synchronizing signal. Preferably, the horizontal synchronizing signal is derived from the last intermediate frequency amplifier of the television signal channel while the vertical synchronizing signal is obtained from the direct current reinsertion tube. Accordingly, the horizontal synchronizing signal is not affected by the video contrast control which is usually arranged in the video channel after the second detector while the vertical synchronizing signal is obtained at an amplitude which is sufficient for directly triggering or synchronizing the vertical scanning wave oscillator.

For a better understanding of the invention, together with other and further objects thereof, reference is made to the following description, taken in connection with the accompanying drawing, and its scope will be pointed out in the appended claims.

The single figure of the accompanying drawing illustrates schematically a television receiver including vertical and horizontal synchronizing circuits embodying the present invention.

Referring now to the drawing, there is illustrated a television receiver comprising antenna 1 adapted to intercept a carrier wave modulated in accordance with a composite video signal. The modulated carrier wave is impressed on converter 2 for converting it into an intermediate frequency signal which is amplified by one or more intermediate frequency amplifiers. Preceding converter 2, there may be provided one or more radio frequency amplifier stages. The output from the last intermediate frequency amplifier stage is impressed on tuned circuit 3 inductively coupled to tuned circuit 4.

Tuned circuit 4 has its high potential end connected to the anode of diode section 5 of a twin diode. Diode section 5 is provided for the purpose of detecting the intermediate frequency composite television signal and for deriving the composite video signal including the horizontal and vertical synchronizing signals and the video signal. The cathode of second detector 5 is connected to ground through resistor 6 and condenser 7 connected in parallel. The demodulated video signal is derived from variable tap 8 on resistor 7 and impressed on control grid 10 of video amplifier 11. By varying tap 8, the contrast of the reproduced picture may be controlled.

Video amplifier 11 preferably is a pentode as illustrated and comprises cathode 12 connected to ground through a biasing network including resistor 13 and condenser 14. Suppressor grid 15 is grounded as shown, while screen grid 16 is connected to a suitable positive voltage supply indicated at B+ through screen grid resistor 17 which is by-passed to ground by condenser 18. Plate 20 of video amplifier 11 is connected to the positive voltage supply B+ through plate resistor 21, shunt inductance element 22 and series inductance element 23.

The amplified video output signal is developed across shunt inductance element 22 and plate resistor 21. Inductance elements 22 and 23 are arranged as peaking coils to improve the high frequency response of video amplifier 11 and to provide for a higher gain with a more linear phase response.

The amplified video output signal developed across shunt inductance element 22 and plate resistor 21 is coupled through coupling condenser 25 and lead 33 to control grid 26 of picture signal reproducing tube 27. The cathode 28 of cathode ray tube 27 may be maintained at a predetermined potential which may be controlled for adjusting the brilliance of the picture reproduced on luminescent screen 30 of cathode ray tube 27 as is conventional.

For the purpose of reinserting the direct current and low frequency video information, there is provided diode 31 having its cathode connected through resistor 32 to lead 33. Lead 33 is connected to ground through resistor 34 while the cathode of diode 31 is connected to lead 33 through bias condenser 35 and resistor 36. The anode of diode 31 is connected to ground through resistor 37 for a purpose to be explained hereinafter.

The composite video signal including the horizontal and vertical synchronizing signals is impressed on control grid 26 of cathode ray tube 27 in such a manner that the synchronizing signals or pulses have negative polarity while the video signal extends in a positive direction. Accordingly, whenever a synchronizing pulse arrives, diode 31 becomes conducting to charge up biasing condenser 35 to a predetermined voltage. During the time interval between two successive horizontal synchronizing pulses, the video signal will extend in a positive direction thus discharging biasing condenser 35 slowly. Consequently, since the horizontal synchronizing pulses will periodically bring condenser 35 to a certain voltage level, each blanking pulse in turn will bring control grid 26 to a predetermined voltage level whereby the low frequency and direct current video information is restored as is conventional. It will also be readily seen that the synchronizing signals pass through diode 31 and may accordingly be derived across anode resistor 37 in a negative polarity. The video channel of the television receiver as described hereinabove is substantially conventional, and it is therefore believed that no further description of its operation is required.

In accordance with the present invention the horizontal synchronizing signal and the vertical synchronizing signal are each derived from a different point of the television signal channel. The horizontal synchronizing signal in particular is derived from diode section 40 which is coupled through a large coupling condenser 41 to the last intermediate frequency amplifier stage. Thus the anode of diode section 40 is connected to coupling condenser 41 provided between the two anodes of diode sections 5 and 40. The anode of diode section 40 is connected to ground through resistors 42 and 43. The junction point of resistors 42 and 43 may be by-passed to ground by condenser 44. The cathode of diode section 40 is also connected to ground through resistor 45 by-passed by condenser 46.

The intermediate frequency signal is impressed on coupling condenser 41. The synchronizing signals correspond to maximum carrier amplitude. Accordingly, coupling condenser 41 is charged whenever a synchronizing pulse arrives which will render diode section 40 conducting. The synchronizing signals may be obtained from output lead 47 which is connected across resistor 45. The synchronizing signals are derived in a positive polarity as indicated at 48. At the same time an automatic gain control signal is developed across resistors 42 and 43 which are connected between ground and the anode of diode section 40. The automatic gain control signal may be derived from output lead 50 connected to the junction point of resistors 42 and 43 and may be fed back to intermediate frequency amplifier 2, as indicated, for controlling the gain in one or more of the intermediate frequency amplifier stages. The automatic gain control responds only to the peak of the intermediate frequency signal, that is, to the synchronizing impulses, as is conventional television receiver practice.

It will be understood that the horizontal as well as the vertical synchronizing signals are derived from output lead 47. However, the amplifier chain connected to output lead 47 is provided with differentiating networks which will develop the horizontal synchronizing signal while the vertical synchronizing signal is substantially rejected. The horizontal synchronizing signal chain includes amplifier 51 having a grid 52 connected to lead 47. Amplifier 51 preferably is a triode and simply serves for amplifying the horizontal synchronizing signal obtained from lead 47. The cathode of amplifier 51 is connected to ground through a bias network consisting of resistor 53 and condenser 54. The plate of amplifier 51 is connected through plate resistor 55 and lead 56 to a suitable positive voltage source indicated at B+.

Amplifier 51 is coupled to horizontal synchronizing amplifier 57 through a differentiating network including coupling condenser 58 and grid leak resistor 60 connected between the control grid 61 of amplifier 57 and ground. The differentiating network including condenser 58 and resistor 60 preferably has a time constant that is short compared to the frequency of the horizontal synchronizing signal. The frequency of the horizontal synchronizing signal is 15,750 cycles per second corresponding to a time constant of 63.5 microseconds. Thus the time constant of differentiating network 58, 60 may be of the order of 12 microseconds. The time constants of the differentiating networks which couple the horizontal synchronizing signal amplifiers can be made short because the vertical synchronizing signal is derived from another point of the television signal channel as will be explained hereinafter.

It is furthermore desirable that the horizontal synchronizing signal shall not be affected by the video contrast control which may be adjusted by variable tap 8. It will be clear from an inspection of the drawing that the horizontal synchronizing pulses are derived directly from the intermediate frequency signal and are accordingly not subject to the video contrast control.

Horizontal synchronizing amplifier 57 preferably is a pentode as illustrated. The cathode of amplifier 57 is connected to ground through a biasing network comprising resistor 62 and condenser 63. The suppressor grid is connected to ground as illustrated, while the screen grid is connected to the positive voltage supply B+ through screen grid resistor 64. The screen grid is furthermore connected to ground through resistor 65 and condenser 66 connected in parallel. The plate of amplifier 57 is also connected to voltage supply B+ through plate resistor 67.

The wave form impressed on control grid 61 of amplifier 57 is illustrated at 70. This wave is greatly amplified by amplifier 57 as illustrated at 71, and the width of the pulse is slightly increased in view of the large plate load, that is, the large resistance of plate resistor 67 into which the tube is working.

The signal illustrated at 71 is impressed upon control grid 72 of amplifier 73 through coupling condenser 74. Grid 72 is connected to ground through grid leak resistor 75. Amplifier 73 may also be a pentode as illustrated, and its connections are substantially identical to that of amplifier 57 so that a detailed description thereof is not deemed to be necessary.

Coupling condenser 74 and grid leak resistor 75 function again as a differentiating network having a time constant of approximately 12 microseconds. The signal illustrated at 71 is accordingly differentiated by network 74, 75 and applied to control grid 72 of amplifier 73. The large differentiated pulse will cause amplifier 73 to draw considerable grid current on the positive portion of the differentiated signal so that the wave shape approximates that illustrated at 76. It will be seen that the positive portion of the pulse applied to the grid is flattened and narrowed. The time constant of the cathode bias network of amplifier 73 is such that the bias will hold over a large portion of the cycle whereby the negative portion of the differentiated wave 76 is clipped off.

The signal appearing in the plate circuit of amplifier 73 is illustrated at 77. Signal 77 is again differentiated by a differentiating network including coupling condenser 78 and resistor 80. The time constant of differentiating network 78, 80 is of the order of 30 microseconds which is a larger time constant than that of networks 58, 60 and 74, 75 but which is still short compared to the reciprocal of the frequency of the horizontal synchronizing pulses amounting to 63.5 microseconds. The purpose of differentiating circuit 78, 80 is to reduce the lower frequency components of the pulse which will increase the steepness of the leading edge of the horizontal synchronizing signal as illustrated at 81. This has the advantage that any noise pulse which may ride on the horizontal synchronizing pulse will not vary the instant at which the following oscillator 82 is triggered.

Oscillator 82 preferably comprises a beam power tetrode having a screen grid 83 connected between coupling condenser 78 and resistor 80 which in turn is connected to voltage supply B+ through conductor 56. Oscillator 82 is a relaxation oscillator of the L/R type which is known as a beam relaxer. The operation of the beam relaxer is described in a paper by Madison Cawein which appeared on page 16 of the Radio-Electronic Engineering Department of "Radio News," June 1946. The beam relaxer is the subject matter of a copending application of Madison Cawein, Serial No. 471,977, filed January 11, 1943, now Patent 2,440,895, and entitled "Wave Generator."

The cathode of the beam relaxer 82 is connected to cathode resistor 84 having an adjustable tap 85 which is connected to ground. The plate of beam relaxer 82 is connected to an intermediate point of inductance element 86 having one of its terminals connected through conductor 56 to the positive voltage supply B+ while its other terminal is connected to a rectifier indicated at 87 which operates as a voltage doubler. The control grid of beam relaxer 82 is connected to inductance element 90 inductively coupled to inductance element 86 and by-passed by a damping circuit comprising inductance element 91, resistor 92 and condenser 93 arranged in series. Such a damping circuit is the subject matter of a copending application of Charles J. Thorne, Serial No. 678,579, filed June 22, 1946, now Patent No. 2,493,044, and entitled "Deflection Wave Generator." Horizontal deflecting coils 95 are connected across inductance element 90 and serve the purpose of deflecting the electron beam developed by cathode 28 of cathode ray tube 27 horizontally across its luminescent screen 30.

The beam relaxer operates substantially as follows. Suppose oscillator 82 is cut off momentarily either by the arrival of a negative synchronizing pulse on its screen grid 83 or after a natural period of oscillation determined by the value of L/R. The control grid of oscillator 82 immediately becomes sufficiently positive whereupon the tube again conducts current which rises exponentially. The linearity of the saw-tooth current wave developed across inductance element 90 is improved by the damping circuit 91, 92 and 93. The period of oscillations is determined by the ratio of that portion of the inductance of inductance element 86 which is connected in series between the anode of tube 82 and the conductor 56 divided by the dynamic plate resistance of tube 82. This dynamic plate resistance remains substantially constant during the trace period until suddenly the tube relaxes, its plate resistance varies and a negative pulse is introduced on the control grid whereupon conduction through the tube stops. Beam relaxer 82 is accordingly free running, but may be synchronized by synchronizing pulses of negative polarity impressed on its screen grid which will extinguish the tube. The natural period of oscillation of oscillator 82 may be controlled by means of variable tap 85 on cathode resistor 84. The saw-tooth current wave developed by beam relaxer 82 is of sufficient amplitude so that no further amplifier is required between beam relaxer 82 and deflecting coils 95. The voltage developed during the retrace period across inductance element 86 may be rectified by rectifier 87 and applied through conductor 96 to second anode 97 of cathode ray tube 27.

The vertical synchronizing signal is preferably derived across the anode circuit of diode 31 which functions as the direct current reinserter. In general there are certain objections against deriving the synchronizing signals from the direct current reinserter. Thus the amplitude of the synchronizing pulses varies with the video contrast control effected by variable tap 8, and furthermore a certain amount of the video signal may be passed through diode 31 which consequently appears in the separated synchronizing signals. However, these objections are not valid if only the vertical synchronizing signal is derived from reinsertion tube 31. In the first place the vertical oscillator will hold in very well even if the vertical synchronizing pulses have a comparatively small amplitude. On the other hand, the video signal which may be passed through diode 31 at high contrast levels will not disrupt the vertical synchronization because a large percentage of the video signal is filtered out in the following integrating circuit generally indicated at 100. On the other hand, by deriving the vertical synchronizing signal from the direct current reinserter 31, the advantage is gained that the vertical synchronizing signal is of sufficient amplitude so that it may be fed directly into the vertical oscillator.

The vertical synchronizing signal developed across resistor 37 of direct current reinserter 31 is impressed upon integrating network 100 which comprises series resistors 101 and 102 having their terminals by-passed to ground by condensers 103, 104 and 105. The integrated vertical synchronizing signal is now impressed upon vertical oscillator 106 followed by an amplifier having its output terminals connected to vertical deflecting coils 107. Thus the electron beam developed in cathode ray tube 27 is deflected vertically across luminescent screen 30 by vertical deflecting coils 107. The vertical oscillator indicated in box form at 106 may, for example, consist of a free-running multivibrator.

Experiments have revealed that the synchronizing circuits of the present invention will give very satisfactory results. Thus if the input signal developed at the receiver antenna terminals amounts to at least 100 microvolts, the synchronizing circuits are not affected by shot and input noise. It may be pointed out that a television picture of satisfactory picture quality can only be obtained if the input signal amounts to at least 200 microvolts. In particular the synchronizing circuits of the present invention have a good immunity to external noises which approaches that obtainable with an automatic frequency controlled synchronizing circuit. On the other hand, the circuit of the present invention does not require the additional tubes which are necessary for the conventional automatic frequency controlled synchronizing circuits.

The horizontal synchronizing signal is derived from a point in the television channel which is not subject to the video contrast control, that is, from the last intermediate frequency amplifier. Thus further amplification of the horizontal synchronizing signal is required, but on the other hand, the synchronizing pulses are well clipped and sharply defined. The short time constants of the coupling circuits between the horizontal synchronizing signal amplifiers prevent disruption of a large number of lines by external noise pulses. Any disruption is held to a minimum and will not substantially exceed the duration of a noise pulse.

The vertical synchronizing signal is obtained from the last video amplifier stage or from the direct current reinserter where the signal level is high enough so that the vertical synchronizing signal need not be amplified before it is utilized for synchronizing the vertical oscillator.

While it will be understood that the circuit specifications of the television receiver of the invention may vary according to the design for any particular application, the following circuit specifications for a horizontal and vertical synchronizing circuit are included by way of example only:

Triode 51, ½ Type 6SN7
Amplifier 57, 6SJ7
Amplifier 73, 6AC7
Oscillator 82, 6L6
Condenser 41, .5 microfarad
Resistor 6, 1,000 ohms Condenser 7, 10 micromicrofarads
Resistor 45, 1,000 ohms
Condenser 46, 25 micromicrofarads
Resistor 42, 1,000,000 ohms
Resistor 43, 1,000,000 ohms
Condenser 25, .25 microfarad
Resistor 32, 220,000 ohms
Condenser 35, .1 microfarad
Resistor 36, 10,000 ohms
Resistor 34, 1,000,000 ohms
Resistor 37, 1,000 ohms
Resistor 101, 4,700 ohms
Resistor 102, 4,700 ohms
Condenser 103, .005 microfarad
Condenser 104, .005 microfarad
Condenser 105, .005 microfarad
Resistor 53, 1,000 ohms
Condenser 54, .002 microfarad
Resistor 55, 22,000 ohms
Condenser 58, 250 micromicrofarads
Resistor 60, 47,000 ohms
Resistor 62, 1,200 ohms
Condenser 63, .02 microfarad
Condenser 66, .02 microfarad
Resistor 65, 15,000 ohms
Resistor 64, 47,000 ohms
Resistor 67, 100,000 ohms
Condenser 74, 250 micromicrofarads
Resistor 75, 47,000 ohms
Condenser 78, .005 microfarad
Resistor 80, 6,000 ohms
Resistor 84, 250 ohms While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A television receiver for receiving and utilizing horizontal synchronizing signals comprising a horizontal scanning wave generator and a multi-stage amplifier preceding said generator for amplifying horizontal synchronizing signals applied to said amplifier comprising a plurality of vacuum tubes coupled together in cascade, each stage of said amplifier having a resistive-capacitive coupling network and all the networks of all stages preceding said generator having time constants which are short compared to the reciprocal of the frequency of said synchronizing signals, the time constant of one of said coupling networks being approximately ⅕ of the reciprocal of the frequency of said synchronizing signals and the time constant of another one of said coupling networks being approximately ½ of the reciprocal of the frequency of said synchronizing signals.

2. In a television receiver, a horizontal synchronizing signal channel comprising, first, second and third stage vacuum tube amplifiers, two resistive-capacitive networks coupling respectively said first and second stage and said second and third stage vacuum tubes in cascade and each having a time constant which is approximately one-fifth of the reciprocal of the frequency of the synchronizing signal applied to said horizontal synchronizing channel, and a third resistive-capacitive network coupled to the output circuit of said third stage vacuum tube and having a time constant which is approximately one-half of the reciprocal of the frequency of said synchronizing signal.

ROBERT W. SANDERS.

REFERENCES CITED

The following references are of record in the file of this patent:

UNITED STATES PATENTS

| Number | Name | Date |
|---|---|---|
| 2,208,374 | Lewis | July 16, 1940 |
| 2,219,579 | Poch | Oct. 29, 1940 |
| 2,251,929 | Freeman et al. | Aug. 12, 1941 |

FOREIGN PATENTS

| Number | Country | Date |
|---|---|---|
| 395,499 | Great Britain | July 20, 1933 |